C. W. BIERIG & R. H. LEGG.
AUTOMATIC SLIDE ADVERTISING MACHINE.
APPLICATION FILED JAN. 5, 1915.

1,165,310.

Patented Dec. 21, 1915.
3 SHEETS—SHEET 3.

Witnesses
C. F. Rudolph
J. W. Garner

Inventors
Carl W. Bierig,
Roland H. Legg,

By Victor J. Evans
Attorney

UNITED STATES PATENT OFFICE.

ROLAND H. LEGG AND CARL W. BIERIG, OF JOPLIN, MISSOURI, ASSIGNORS OF ONE-NINTH TO B. F. BROOKE SEWELL, OF JOPLIN, MISSOURI.

AUTOMATIC SLIDE ADVERTISING-MACHINE.

1,165,310.   Specification of Letters Patent.   Patented Dec. 21, 1915.

Application filed January 5, 1915. Serial No. 690.

*To all whom it may concern:*

Be it known that we, ROLAND H. LEGG and CARL W. BIERIG, citizens of the United States, residing at Joplin, in the county of Jasper and State of Missouri, have invented new and useful Improvements in Automatic Slide Advertising-Machines, of which the following is a specification.

This invention relates to improvements in projecting machines such as magic lanterns and the like for projecting advertisements, pictures or other like matter on screens from slides and especially relates to improvements in that class of such machines in which the slides are moved successively by a carrier element past the lenses, the object of the invention being to provide an improved machine of this kind in which an electric lamp is employed and in which the electric circuit which includes the lamp is automatically opened during the instant when the carrier removes one slide and places another in position for projecting, thus avoiding the use of a shutter and of shutter operating mechanism and also enabling the machine to project advertisements, pictures or the like in succession, more rapidly than heretofore.

The invention consists in the construction, combination and arrangement of devices hereinafter described and claimed.

Figure 1:
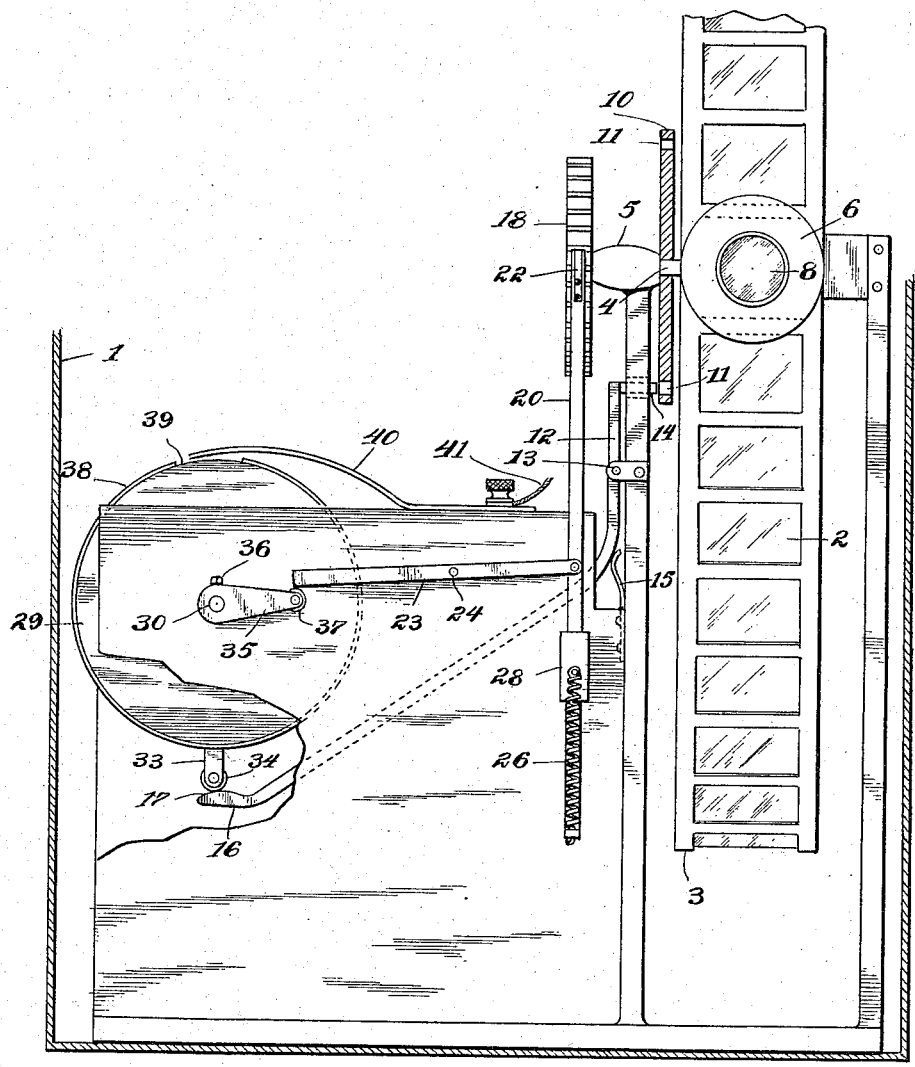
Figure 2:
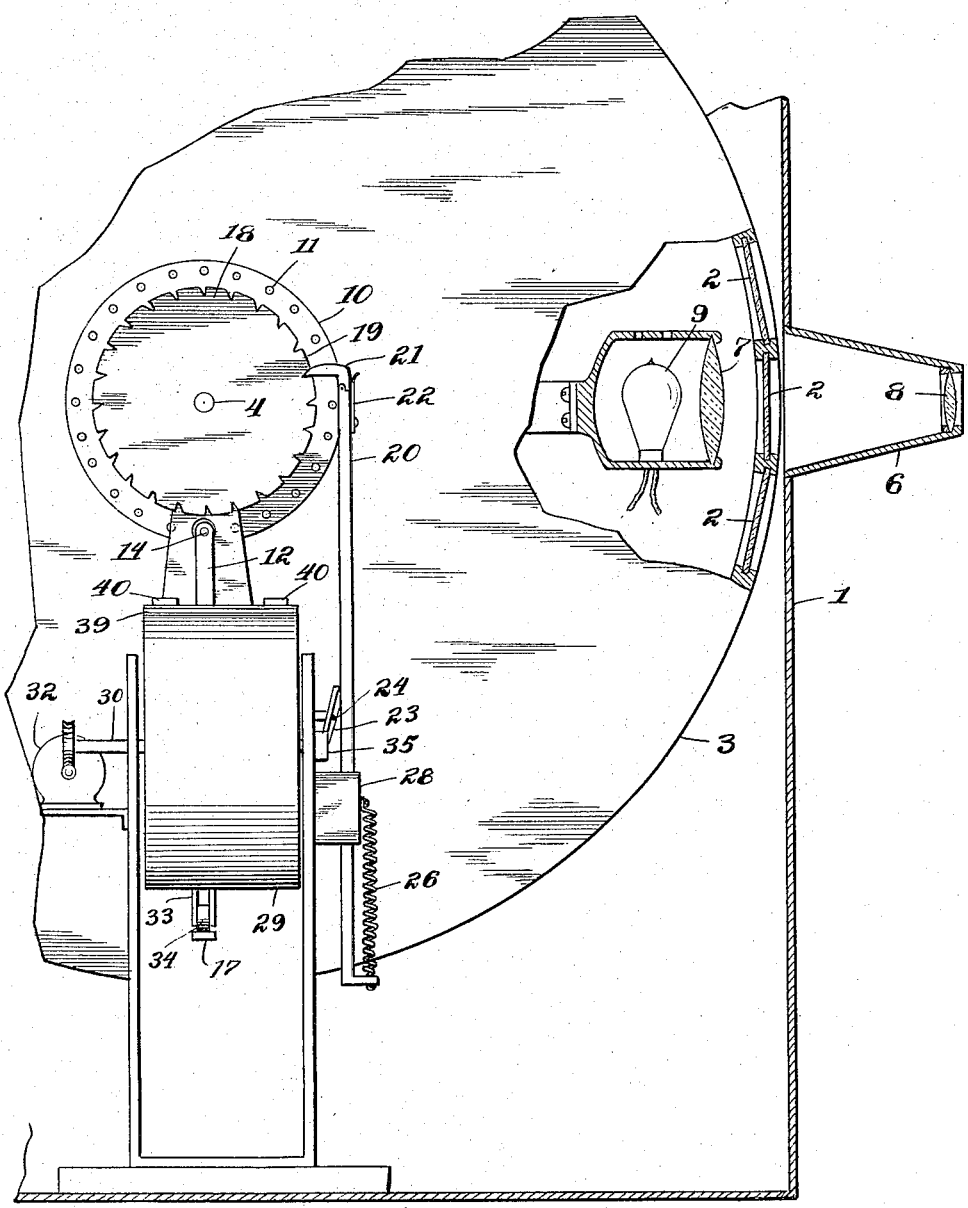
Figure 3:
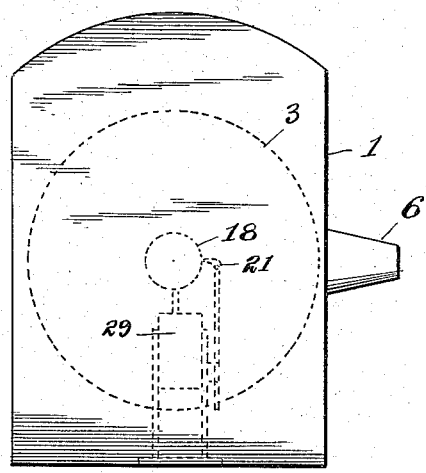
Figure 4:
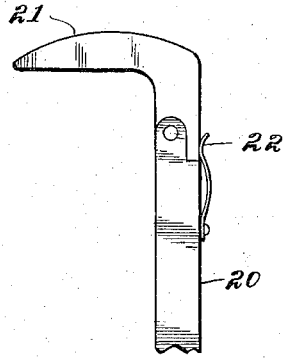
Figure 5:
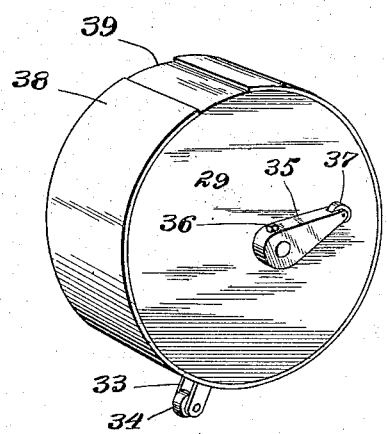

In the accompanying drawings:—Figure 1 is partly a sectional view and partly an elevation of a projecting machine constructed in accordance with our invention. Fig. 2 is partly an elevation and partly a sectional view of the same on a plane at right angles to that of Fig. 1. Figs. 3—4—5 are detail views.

For the purposes of this specification a suitable casing is indicated at 1 and the carrier which carries the slides 2 is shown as a wheel 3, the shaft 4 of which is mounted in bearings in suitable standards 5 which are arranged in the casing. The usual funnel is indicated at 6 provided with the condenser 7 and the projecting lenses 8 and an electric lamp for use in projecting the slides is indicated at 9. The slide carrying wheel 3 is provided at one end with a stop disk 10 which is concentric therewith and is provided with a series of appropriately spaced stop openings 11, the latter being arranged in radial alinement with the slides and a stop opening being provided for each slide, according to the size and capacity of the slide carrying wheel. A stop lever 12 is also provided which is pivotally mounted as at 13 on one of the standards 5 and has a stop pin 14 which is for engagement successively with the stop openings 11, a spring 15 being provided which exerts its tension on the stop lever to keep the latter in such position as to normally keep its pin in engagement with one of the stop openings and thus hold the carrier wheel with one of its slides in operative position with relation to the projecting apparatus. The said stop lever has an arm 16 which is provided with a cam face 17 on one side of its free end.

The shaft 4 of the slide carrying wheel is also provided with an operating wheel which is here shown as a ratchet wheel 18 which has peripheral teeth 19 that correspond in number with the stop openings 11 of the stop disk and with the slides on the carrier wheel. A rod 20 is also provided which is suitably mounted for reciprocating movement and is provided at its upper end with a pivoted dog 21 and with a spring 22 which presses against the dog and engages the latter with one of the ratchet teeth when the rod is moved upwardly. A lever 23 is pivotally mounted as at 24 and is pivotally connected as at 25 to the operating rod 20. A spring 26 is also provided, which is here shown as a coiled retractile spring which has its lower end secured to the lower end of the rod 20 as at 27 and has its upper end connected to a suitable fixed support 28.

A commutator drum 29 is also provided the shaft 30 of which is here shown mounted in bearings in a casing or frame 31. This commutator drum is driven by a motor of any suitable type or construction, an electric motor 32 being here shown for the purposes of this specification. The commutator drum is provided at one end with a radial tappet arm 33 which carries a tappet roller 34 which is for engaging the cam face 17 of the lever 12 and operating said lever once during each rotation of the commutator drum and on one end of the shaft of said drum is an arm 35 which is adjustably secured as by means of a set screw 36 and is provided at its free end with a tappet roller 37 for engaging the lever 23 and causing the latter to actuate the rod 20.

The commutator drum is provided with a peripheral conductor 38 which in practice is a brass or copper cylinder having an opening 39. A pair of copper or other suitable contact brushes 40 are also provided to bear on the periphery of the commutator drum and which are connected, by conducting wires 41 in electric circuit with the lamp 9.

The opening 39 of the commutator drum is opposite the free ends of the brushes, so as to break the electric circuit of the electric lamp at the same time that the cam 17 of the arm 12 is engaged by the tappet element 34 and the operating lever 23 is engaged by the tappet element 37. Hence at each rotation of the drum the electric circuit of the projecting lamp is broken and while the drum is moving through a space equal to the width of its opening 39 the tappet element 34 turns the lever 12 so as to disengage its stop pin from a stop opening in the stop disk and the tappet element 37 moves the lever 23 a sufficient distance to cause the latter to move the rod 20 against the tension of its spring 28, and hence cause the dog 21 to turn the wheel 18 a sufficient distance to keep the carrier wheel to move the projected slide out of the way and place another slide in operative relation to the projecting apparatus. As the tappet element 34 clears the cam 17 the spring 15 turns the lever 12 to engage the pin of the latter with the stop opening of the disk that corresponds with the placed slide and as the tappet element 37 clears the lever 23 the spring 26 moves the rod 20 upwardly to engage its dog 21 with the next succeeding tooth of the tappet wheel 18. Hence our projecting apparatus is automatic in operation and requires practically no attention. Moreover by providing a commutator and its connections we are enabled to entirely dispense with the use of a shutter for a projecting light.

Having thus described our invention, we claim:—

In a projecting machine of the class described the combination of a slide carrier wheel mounted for rotation and having a stop element provided with stop openings corresponding with the slides of said carrier wheel, a ratchet wheel rotatable with said carrier wheel, a spring pressed stop lever having means to successively engage the stop openings, a spring retractable operating rod having a dog to engage and partly turn the ratchet wheel and hence correspondingly move the carrier wheel, an operating lever for said rod, an electric lamp, brushes connected in said circuit with the lamp, a commutator drum mounted for rotation and to coact with the brushes to open and close the lamp circuit, a tappet element carried by said drum to operate the stop lever and a tappet element carried by said drum to actuate said operating lever.

In testimony whereof we affix our signatures in presence of two witnesses.

ROLAND H. LEGG.
CARL W. BIERIG.

Witnesses:
  CHARLES I. BARBOUR,
  FRED. BIERIG.

Copies of this patent may be obtained for five cents each, by addressing the "Commissioner of Patents, Washington, D. C."